(12) United States Patent
Hassan et al.

(10) Patent No.: US 8,964,614 B1
(45) Date of Patent: Feb. 24, 2015

(54) METHOD AND APPARATUS FOR IDLE MODE SYNCHRONIZATION

(75) Inventors: Kafi I Hassan, Fairfax, VA (US); Moshe Stoler, Gaithersburg, MD (US); Ernest K Erskine, Silver Spring, MD (US)

(73) Assignee: Sprint Spectrum L.P., Overland Park, KS (US)

( * ) Notice: Subject to any disclaimer, the term of this patent is extended or adjusted under 35 U.S.C. 154(b) by 911 days.

(21) Appl. No.: 13/162,570

(22) Filed: Jun. 16, 2011

(51) Int. Cl.
*G08C 17/00* (2006.01)
*H04L 1/18* (2006.01)
*H04L 29/08* (2006.01)

(52) U.S. Cl.
CPC ......... *H04L 1/1848* (2013.01); *H04L 29/08963* (2013.01)
USPC ........... 370/311; 370/318; 370/328; 370/329; 370/331; 455/566

(58) Field of Classification Search
CPC ...................................................... G08C 17/00
See application file for complete search history.

(56) References Cited

U.S. PATENT DOCUMENTS

| 6,058,289 | A | 5/2000 | Gardner et al. |
| 6,871,074 | B2 | 3/2005 | Harris et al. |
| 2008/0026692 | A1* | 1/2008 | Kojima .............................. 455/7 |
| 2008/0031174 | A1* | 2/2008 | Saifullah et al. ............... 370/311 |
| 2010/0223484 | A1* | 9/2010 | Bold et al. ..................... 713/324 |

* cited by examiner

Primary Examiner — Ayaz Sheikh
Assistant Examiner — Hai-Chang Hsiung (57) ABSTRACT

A method and system to manage idle mode operation of a communication device are disclosed. The method includes receiving from the communication device a request to enter idle mode comprising a request to enable automatic renewal of an internet protocol (IP) address currently assigned to the communication device, transmitting, to an IP address allocation unit which allocated the IP address to the communication device, the idle mode request, receiving, from the IP address allocation unit, an idle mode response comprising an IP lease update acknowledgement associated with the idle mode request, transmitting, to the communication device, the idle mode response, enabling automatic renewal of the IP address, configuring an idle mode timer, and transmitting to the IP address allocation unit, an IP lease update request corresponding to the IP address, when the idle mode timer expires and the communication device is in idle mode.

14 Claims, 5 Drawing Sheets

METHOD AND APPARATUS FOR IDLE MODE SYNCHRONIZATION

TECHNICAL BACKGROUND

Wireless communication systems have become an important means by which many people worldwide have come to communicate. A wireless communication system may provide communication for a plurality of wireless devices, each of which may be serviced through one or more access nodes of the communication system.

Nowadays, many wireless devices are designed to perform tasks beyond voice communications, such as internet browsing, calendar applications, email applications, navigation applications, and even user-generated applications. To perform these and other tasks, wireless devices require increased processing power and the capability to communicate wirelessly at increasingly higher rates. Increased processing power and increased wireless data rates generally increases consumption of limited battery power, and thus, wireless devices must optimize their battery power usage.

One way of reducing battery power usage is by entering idle mode when the device is not in engaged in a communication session, and remaining in idle mode for as long as possible.

OVERVIEW

A method to manage idle mode operation of a communication device is disclosed. The method includes receiving, by a node of the communication system from the communication device, a request to enter idle mode comprising a request to enable automatic renewal of an internet protocol (IP) address currently assigned to the communication device comprising a length of an IP address lease timer corresponding to the IP address currently allocated to the communication device and a length of an IP address update lease timer corresponding to the IP address, transmitting, to an IP address allocation unit which allocated the IP address to the communication device, the idle mode request, receiving, from the IP address allocation unit, an idle mode response comprising an IP lease update acknowledgement associated with the idle mode request, transmitting, to the communication device, the idle mode response, enabling, by the node of the communication system, automatic renewal of the IP address, configuring, by the node of the communication system, an idle mode timer corresponding to the IP address update lease timer, and transmitting, by the node of the communication system to the IP address allocation unit, an IP lease update request corresponding to the IP address, when the idle mode timer expires and the communication device is in idle mode.

In the method above, the IP address allocation unit may include a dynamic host configuration protocol server and the communication system may include a wireless communication system.

A communication system element is disclosed. The communication system element includes a communication interface configured to communicate with at least an internet protocol (IP) address allocation unit and an access node of the communication system, and a processing system coupled to the communication interface comprising a processing unit and a storage unit.

The processing system of the communication system element may be configured to control the communication system element to receive, from the access node, a request to enter idle mode comprising a request to enable automatic renewal of an IP address currently assigned to the communication device comprising a length of an IP address lease timer corresponding to the IP address currently allocated to the communication device by the IP address allocation unit and a length of an IP address update lease timer corresponding to the IP address by the IP address allocation unit, transmit, to the IP address allocation unit, the idle mode request, receive, from the IP address allocation unit, an idle mode response comprising an IP lease update acknowledgement associated with the idle mode request, transmit, to the access node, the idle mode response, enable automatic renewal of the IP address, configure an idle mode timer corresponding to the IP address update lease timer, and transmit, to the IP address allocation unit, an IP lease update request corresponding to the IP address, when the idle mode timer expires and the communication device is in idle mode.

In the communication system element above the IP address allocation unit may include a dynamic host configuration protocol server. The communication system element may be an element of a wireless communication system.

DETAILED DESCRIPTION

The foregoing general description, the following detailed description, and the accompanying drawings, are exemplary and explanatory only and are not restrictive of the present teachings, as claimed. The following detailed description and accompanying drawings set forth the best mode of the present teachings. For the purpose of teaching inventive principles, some aspects of the best mode may be simplified or omitted where they would be known to those of ordinary skill in the art.

The appended claims specify the scope of the present teachings. Some aspects of the best mode may not fall within the scope of the present teachings as specified by the claims. Thus, those skilled in the art will appreciate variations from the best mode that fall within the scope of the present teachings. Those skilled in the art will also appreciate that the features described below can be combined in various ways to form multiple variations of the present teachings. As a result, the present teachings are not limited to the specific examples described below, but only by the claims and their equivalents.

Figure 1:
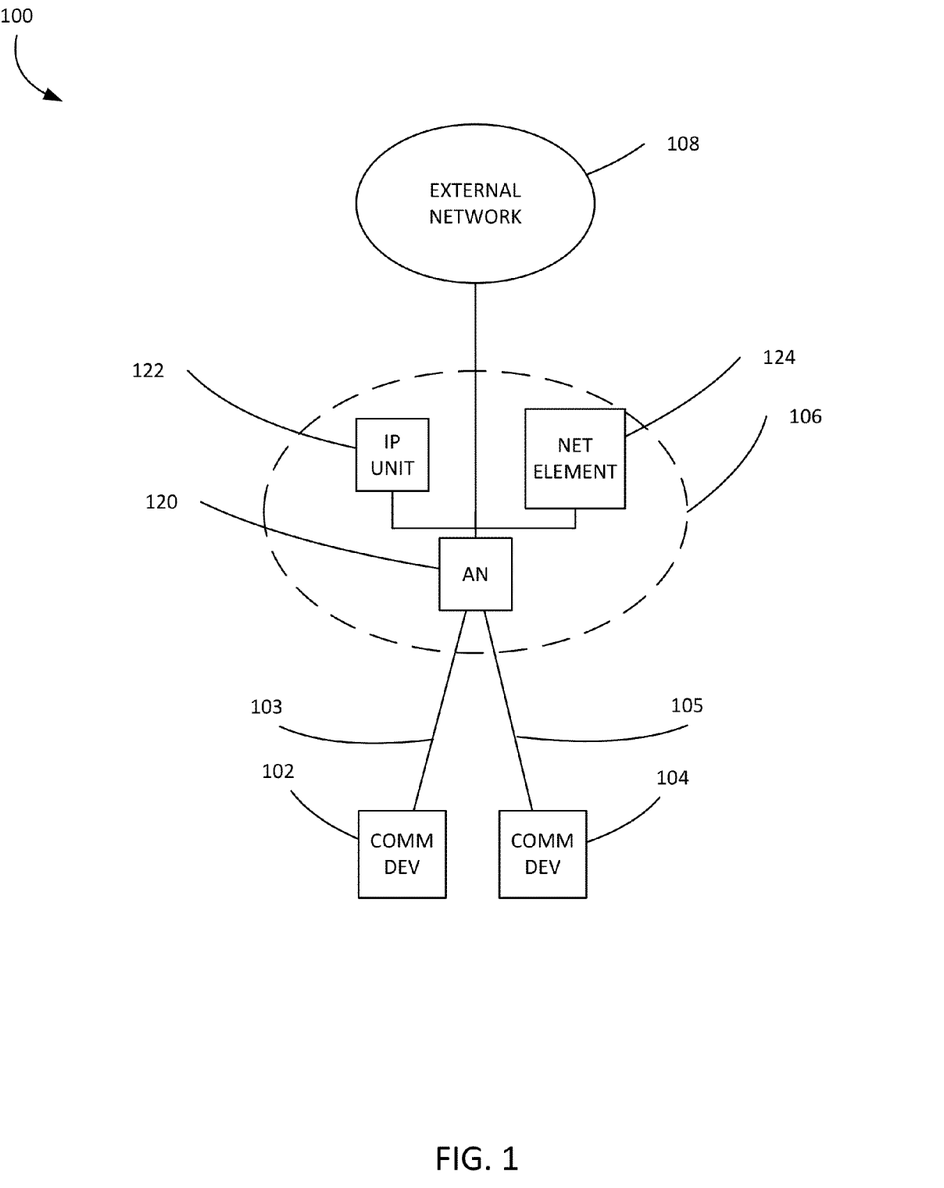
FIG. 1 illustrates a communication environment depicting certain aspects of the present teachings.

FIG. 1 illustrates communication environment 100 depicting certain aspects of the present teachings. Communication environment 100 comprises communication devices 102 and 104, communication system 106, and external network 108. Communication system 106 comprises access node 120, IP address allocation unit 122, and network element 124, Communication system 106 provides communication services to communication devices 102 and 104, and may be implemented using one or more communication protocols, such as integrated Digital Enhanced Network (iDEN), Code Division Multiple Access (CDMA), Evolution Data Only (EVDO), Worldwide Interoperability for Microwave Access (WiMAX), Global System for Mobile Communication (GSM), Long Term Evolution (LTE), Wireless Fidelity (WIFI), High Speed Packet Access (HSPA), or some other communication format. Communication system 106 may provide half-duplex voice service, full-duplex voice service, and/or circuit switch/packet data service to communication devices 102 and 104.

Communication devices 102 and 104 may include any electronic device that may be used for voice and/or data communication over a wireless communication system. Examples of communication devices 102 and 104 include, but are not limited to, cellular phones, smartphones, personal digital assistants (PDAs), handheld devices, wireless modems, laptop computers, and personal computers. Communication devices 102 and 104 may communicate with access node 106 over wireless links 103 and 105, respectively. Wireless links 103 and 105 use the air or space as their transport media and may carry data using various protocols, such as iDEN, CDMA, EVDO, WiMAX, GSM, LTE, WIFI, HSPA, or some other wireless communication format. Communication devices 102 and 104 may be subscribers of communication system 106 or may be subscribers of another communication system (not shown) and capable of roaming into (and of being served by) communication system 106.

Access node 120 may include an access node radio and control equipment contained in a base transceiver station (BTS), or cell site. However, an access node according to the present embodiment is not so limited and may be configured differently. Access node 120 may be used to provide a link between communication system 106 and communication devices 102 and 104, and may further provide connectivity between communication devices 102 and 106 and external network 108. The external network 108 may be the Internet, a wide area network (WAN), a local area network (LAN), an intranet, another carrier network, or other type of communication network.

Access node 120 may communicate with IP address allocation unit 122 and with network element 124 over communication links comprising metal, glass, air, space, or some other material as the transport media and communication therein may be realized through communication protocols such as Internet Protocol (IP), Ethernet, or some other communication format—including combinations thereof. Communication between access node 120, IP address allocation unit 122, and network element 124 may be through direct links or may include intermediate networks, systems, or devices.

IP address allocation unit 122 may be any unit capable of allocating IP addresses to communication devices served by communication system 106. Although IP address allocation 122 is shown within communication system 106, the present teachings are not so limited, and the IP address allocation unit may be located outside communication system 106 and reached by communication system 106 through known methods. In an exemplary embodiment, an IP address allocation unit 122 may be realized by a dynamic host configuration protocol (DHCP) server.

Network element 124 may be any element which aggregates subscriber and control traffic from access nodes within a communication system. Network element 124 may provide subscriber management, network optimization, and forwarding of all subscriber traffic. In an exemplary embodiment, a network element 124 may be realized by an access service network (ASN) gateway of a WiMAX-based communication system.

Figure 2:
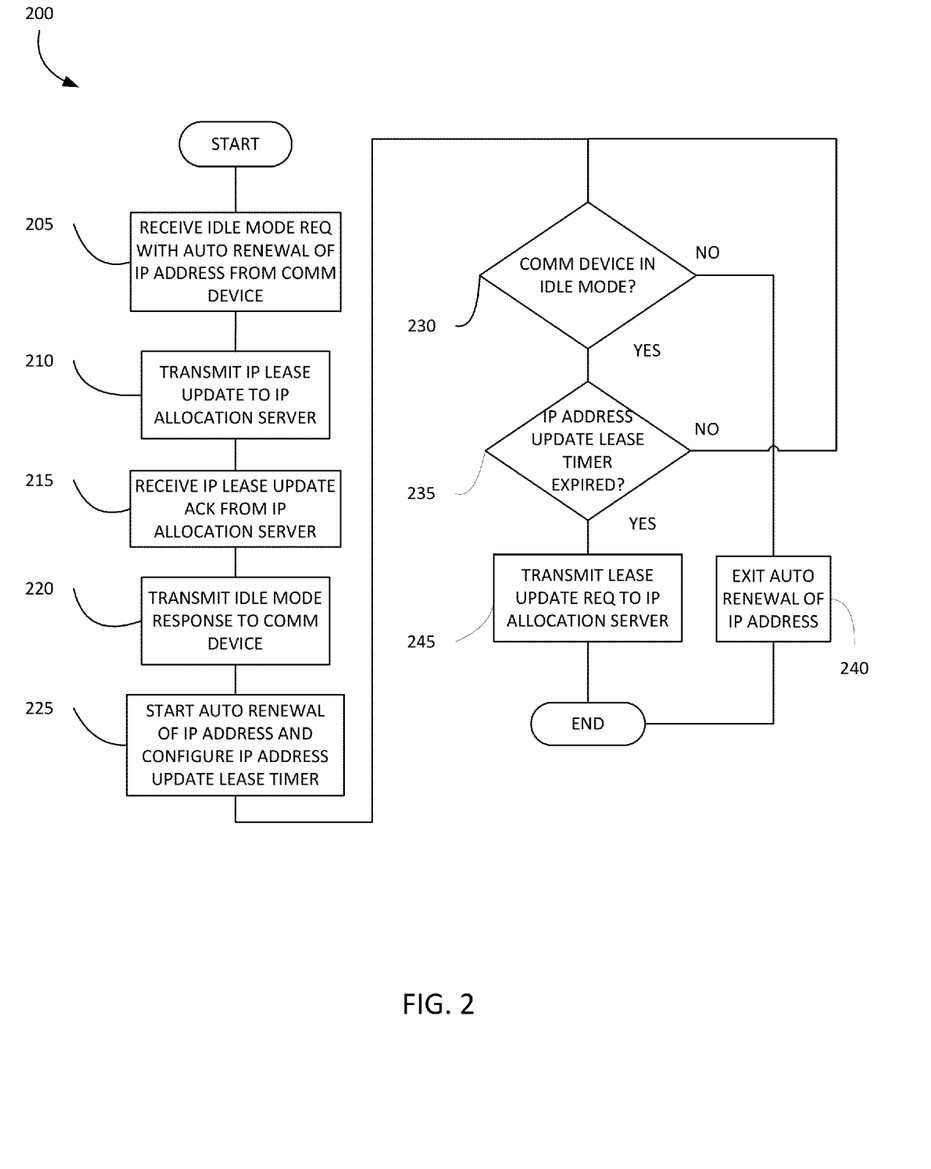
FIG. 2 includes a flowchart illustrating a process of an exemplary embodiment of the present teachings.

FIG. 2 illustrates a process 200 for operating network element 124 of communication environment 100 depicting certain aspects of the present teachings. At step 205 network element 124 receives an idle mode request from a communication device (e.g., communication device 102), including a request for auto-renewal of an IP address currently allocated to communication device 102. At step 210 network element 124 transmits an IP address lease update to IP allocation unit 122.

At step 215 network element 124 receives an IP address lease update acknowledgement from the IP allocation unit 122. At step 220 network element 124 transmits an idle mode response to communication device 102. At this time, communication device 102 may enter idle mode. At step 225 network element 124 starts auto-renewal of the IP address currently allocated to communication device 102 and configures an IP address update lease timer to the update lease period.

At step 230 network element 124 determines whether communication device 102 is in idle mode. The determination may be based, for example, on information stored in a network database within network element 124 regarding the status of communication devices served by communication system 106, on information accessible to network element 124 from another element of communication system 106, or on information accessible to network element 124 from an element outside of communication system 106. When network element 124 determines that communication device 102 is not in idle mode, network element 124 exits auto-renewal of the IP address (step 240) and process 200 ends. When network element 124 determines that communication device 102 is in idle mode, network element 124 determines whether the IP address update lease timer has expired (step 235). When IP address update lease timer has not expired, network element 124 will continue performing steps 230 and 235 until either communication device exits idle mode (step 230) or the IP address update lease timer expires (step 235). At step 245, when the IP address update lease timer expires, network element 124 transmits an IP address lease update request to IP address allocation unit 122 to update/renew the IP address currently assigned to communication device 102.

In the present exemplary embodiment, communication device 102 requests network element 124 to auto-renew an IP address currently allocated to communication device 102. When auto-renewal is enabled, communication device 102 may enter idle mode and does not need to exit idle mode to renew the IP address with IP address allocation unit 122. Instead, network element 124 renews the IP address with IP address allocation unit 122. The present exemplary embodiment allows communication device 102 to remain in idle mode for a longer period of time, thus saving battery power that would have been consumed when exiting idle mode and transmitting over-the-air signals to the access node to renew the IP address with the IP address allocation unit 122. Furthermore, the present exemplary embodiment increases system capacity by eliminating the need for an idle communication device to transmit over-the-air signals to renew IP addresses currently assigned thereto.

Figure 3:
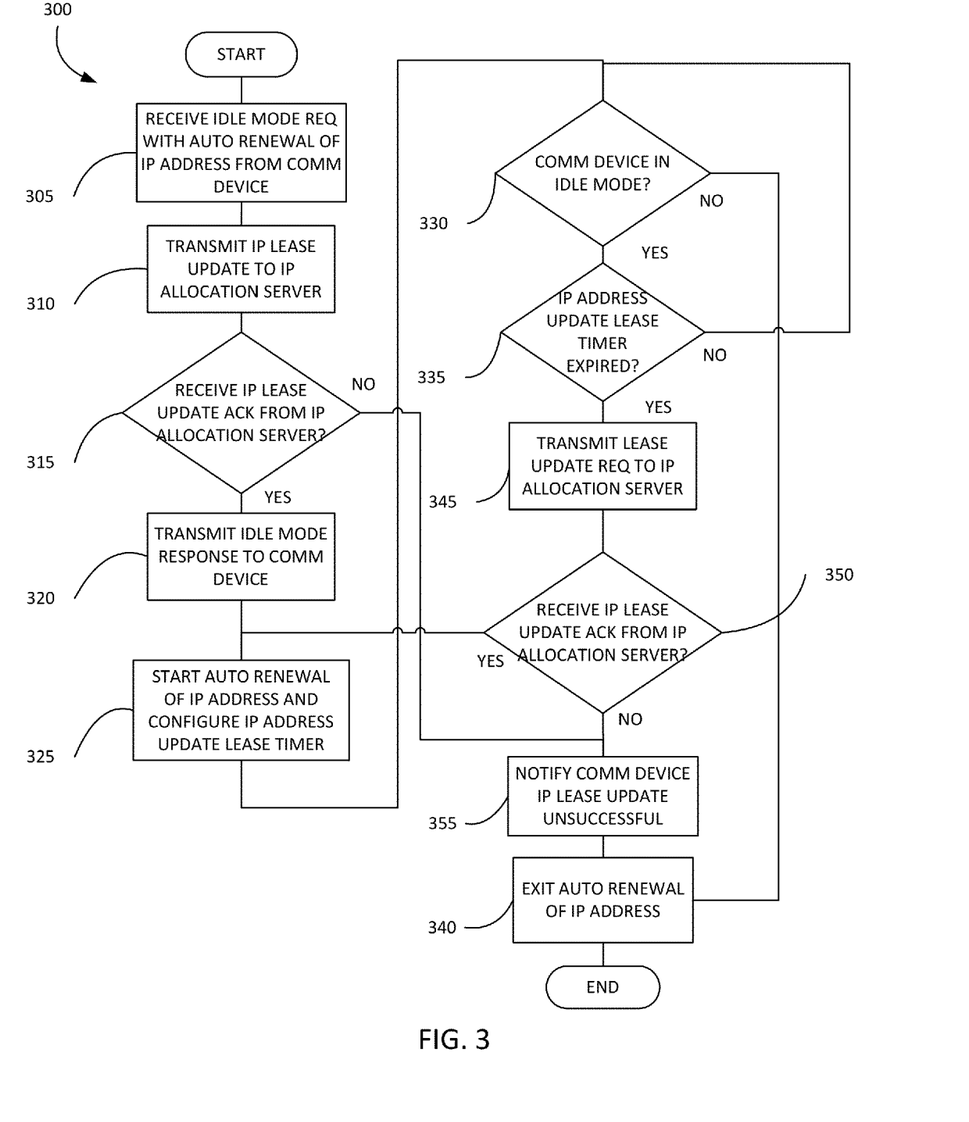
FIG. 3 includes a flowchart illustrating a process of an exemplary embodiment of the present teachings.

FIG. 3 illustrates a process 300 for operating network element 124 of communication environment 100 depicting certain aspects of the present teachings. At step 305 network element 124 receives an idle mode request from a communication device (e.g., communication device 102), including a request for auto-renewal of an IP address currently allocated to communication device 102. At step 310 network element 124 transmits an IP address lease update to IP allocation unit 122.

At step 315, when network element 124 does not receive an IP address lease update acknowledgement from the IP allocation unit 122 (or receives an indication that the IP address lease update was not successful), network element 124 notifies communication device 102 that the IP address lease update was unsuccessful (step 355), exits auto-renewal of the IP address (step 340), and process 300 ends. When network element 124 receives an IP address lease update acknowledgement from the IP allocation unit 122, network element 124 transmits an idle mode response to communication device 102 (step 320), and thus, communication device 102 may enter idle mode. At step 325 network element 124 starts auto-renewal of the IP address currently allocated to communication device 102 and configures an IP address update lease timer to the update lease period.

At step 330 network element 124 determines whether communication device 102 is in idle mode. The determination may be based, for example, on information stored in a network database within network element 124 regarding the status of communication devices served by communication system 106, on information accessible to network element 124 from another element of communication system 106, or on information accessible to network element 124 from an element outside of communication system 106. When network element 124 determines that communication device 102 is not in idle mode, network element 124 exits auto-renewal of the IP address (step 340) and process 300 ends. When network element 124 determines that communication device 102 is in idle mode, network element 124 determines whether the IP address update lease timer has expired (step 335). When IP address update lease timer has not expired, network element 124 will continue performing steps 330 and 335 until either communication device exits idle mode (step 330) or the IP address update lease timer expires (step 335). At step 345, when the IP address update lease timer expires, network element 124 transmits an IP address lease update request to IP address allocation unit 122.

At step 350, when network element 124 does not receive an IP address lease update acknowledgement from the IP allocation unit 122, or receives an indication that the IP address lease update was not successful, network element 124 notifies communication device 102 that the IP address lease update was unsuccessful (step 355) (taking communication device 102 out of idle mode), exits auto-renewal of the IP address (step 340), and process 300 ends. When network element 124 receives an IP address lease update acknowledgement from the IP allocation unit 122, network element 124 starts auto-renewal of the IP address and re-configures an IP address update lease timer to the update lease period (step 325).

In the present exemplary embodiment, communication device 102 requests network element 124 to auto-renew an IP address currently allocated to communication device 102. When auto-renewal is enabled, communication device 102 may enter idle mode and does not need to exit idle mode to renew the IP address with IP address allocation unit 122. Instead, network element 124 renews the IP address with IP address allocation unit 122. When renewal of the IP address with the IP address allocation unit is unsuccessful, network element 124 exits auto-renewal mode and notifies the communication device that renewal of the IP address was unsuccessful (this takes communication device out of idle mode). When auto-renewal of the UP address is successful, network element 124 remains in auto-renewal mode and resets the IP address update lease timer without taking the communication device out of idle mode.

The present exemplary embodiment allows communication device 102 to remain in idle mode for a longer period of time, thus saving battery power that would have been consumed when exiting idle mode and transmitting over-the-air signal to renew the IP address with the IP address allocation unit 122. Furthermore, the present exemplary embodiment increases system capacity by eliminating the need for a communication device in idle mode to transmit over-the-air signals to renew IP addresses currently assigned thereto.

Figure 4:
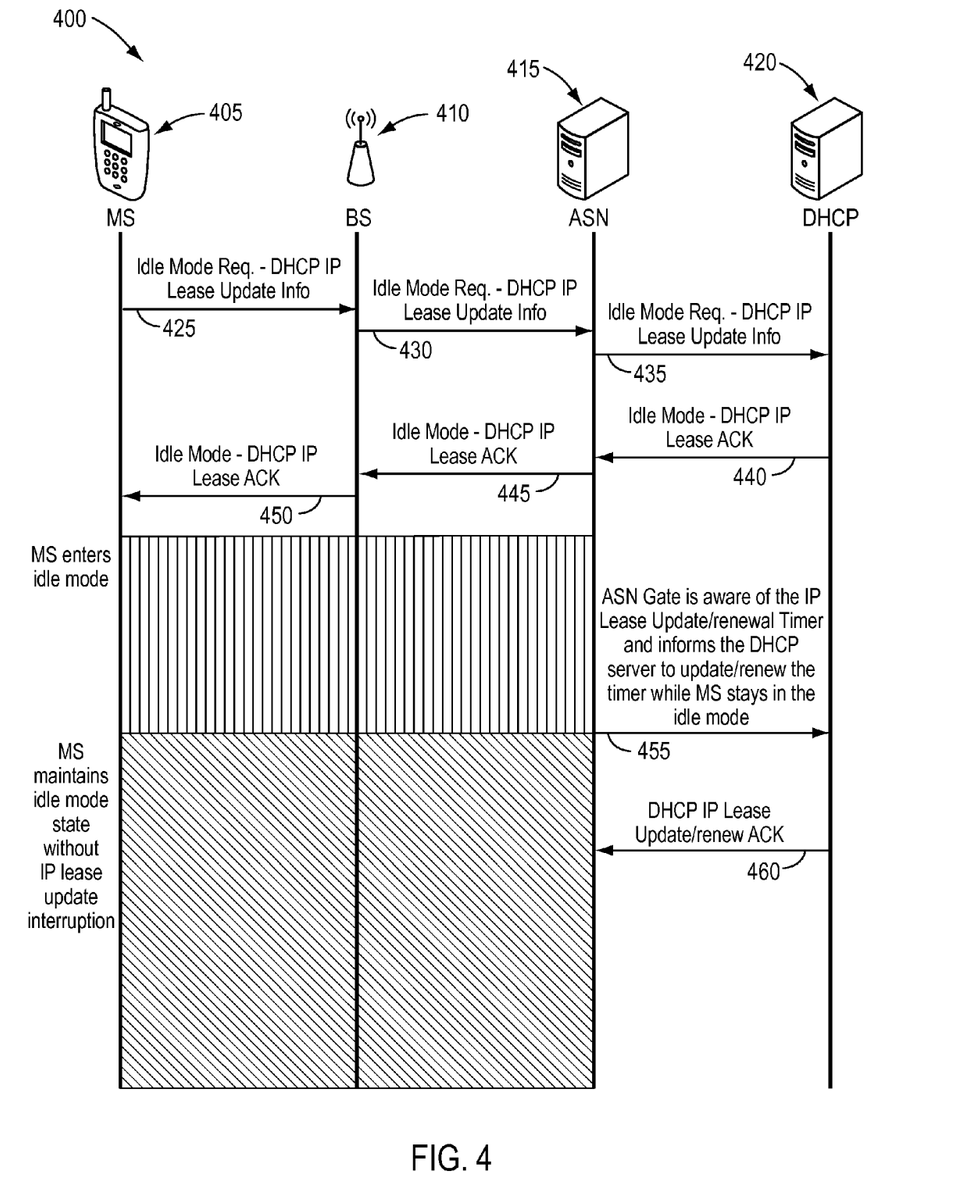
FIG. 4 includes a message sequence chart illustrating a process of an exemplary embodiment of the present teachings.

FIG. 4 depicts a message sequence chart illustrating certain aspects of the present teachings. Mobile subscriber (MS) 405 transmits an idle mode request message (425) to a communication system through base station (BS) 410. The idle mode request message includes dynamic host configuration protocol (DHCP) IP lease update information comprising an IP address currently assigned to MS 405 and a DHCP IP update lease timer corresponding to the lease of the IP address to MS 405. BS 410 forwards the idle mode request (430) to an access service network (ASN) 415 of the communication system.

ASN 415 transmits an idle mode request (435) to DHCP server 420, including an update for the IP address. In response, DHCP server 420 transmits an idle mode response (440) to ASN 415 including a DHCP IP lease acknowledgement. ASN 415 forwards the idle mode response (445) to BS 410, which forwards the idle mode response (450) to MS 405.

When receiving the idle mode response 450, MS 405 enters idle mode and ASN 415 starts an IP address update lease timer. When the IP address update lease timer expires, ASN 415 requests DHCP server 420 to update/renew the IP address (455), allowing MS 405 to remain in idle mode. In response, DHCP server 420 transmits an acknowledgement of the DHCP IP address update/renewal (460) to ASN 415. ASN 415 does not forward the acknowledgement to MS 405 and MS 405 which remains in idle mode.

The present exemplary embodiment allows communication device MS 405 to remain in idle mode for a longer period of time, thus saving battery power that would have been consumed when exiting idle mode and transmitting over-the-air signals to BS 410 to renew the IP address with the DHCP server 420. Furthermore, the present exemplary embodiment increases system capacity by eliminating the need for an idle communication device to transmit over-the-air signals to renew IP addresses currently assigned thereto.

As used herein, the term "communication device" refers to an electronic device that may be used for voice and/or data communication over a wireless communication system. Examples of communication devices devices include, but are not limited to, cellular phones, personal digital assistants (PDAs), handheld devices, wireless modems, laptop computers, and personal computers. A communication device may alternatively be referred to as a wireless device, an access terminal, a mobile terminal, a mobile station, a subscriber station, a remote station, a user terminal, a terminal, a subscriber unit, a mobile device, a user equipment, or some other similar terminology.

A communication device according to the present teachings may include a communication interface and processing elements configured to operate as described in the present teachings. Communication interface elements may include an antenna (or antennas) coupled to Radio Frequency (RF) communication circuitry that processes RF signals received over the antenna. The RF communication circuitry typically includes at least an amplifier, filter, modulator, and signal processing circuitry. A communication device may also include a user interface, memory device, software, processing circuitry, or some other communication components.

The term "access node" refers to a wireless communication station that is installed at a fixed location and used to communicate with communication devices. An access node may alternatively be referred to as a base station, an access point, a Node B, an evolved Node B, or some other similar terminology. An access node includes RF communication circuitry and an antenna. The RF communication circuitry typically includes an amplifier, filter, RF modulator, and signal processing circuitry. An access node may also include a router, server, memory device, software, processing circuitry, cabling, power supply, network communication interface, structural support, or some other communication apparatus.

An access node may communicate with one or more wireless devices via transmissions on the uplink and the downlink. The uplink (or reverse link) refers to the communication link from the wireless device to the access node, and the downlink (or forward link) refers to the communication link from the access node to the wireless device. A variety of multiple access techniques are known, including integrated Digital Enhanced Network (iDEN), Code Division Multiple Access (CDMA), Evolution Data Only (EVDO), Worldwide Interoperability for Microwave Access (WiMAX), Global System for Mobile Communication (GSM), Long Term Evolution (LTE), Wireless Fidelity (WIFI), High Speed Packet Access (HSPA), and so forth.

Figure 5:
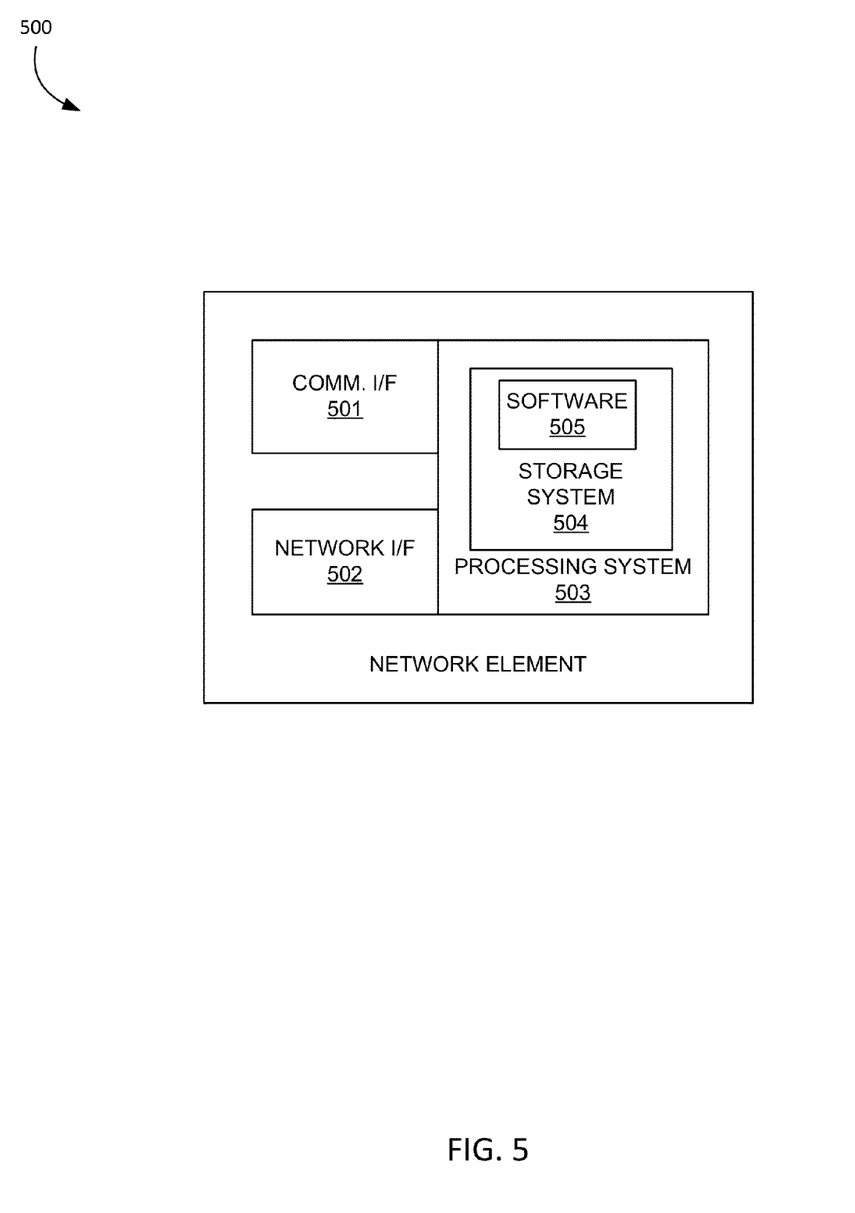
FIG. 5 illustrates a network element for performing certain aspects of an exemplary embodiment of the present teachings.

FIG. 5 illustrates a network element 500 according to the present teachings. Network element 500 is an example of network element 124 of FIG. 1, and thus, is comprised in a communication system such as communication system 106 described above with respect to FIG. 1. Network element 500 includes a communication interface 501 to communicate with one or more elements of the communication system, such as access node 120 and IP address allocation unit 122 of FIG. 1. Network element 500 further includes network interface 502 to communicate with other networks, such as external network 108 of FIG. 1.

Network element 500 further includes processing system 503, which is linked to communication interface 501 and network interface 502. Processing system 503 includes processing circuitry for executing software 505 and storage system 504 to stores software 505. Network element 500 may further include other well-known components such as a power management unit, a control interface unit, etc., that are not shown for clarity.

Processing system 503 may include a microprocessor and other circuitry that retrieves and executes software 505 from storage system 504. Storage system 504 may include a disk drive, flash drive, data storage circuitry, or some other memory apparatus. Processing system 503 is typically mounted on a circuit board that may also hold storage system 504 and portions of communication interface 501 and network interface 502. Software 505 may include computer programs, firmware, or some other form of machine-readable processing instructions. Software 505 may also include an operating system, utilities, drivers, network interfaces, applications, or some other type of software. When executed by processing system 503, software 505 directs processing system 503 to operate network element 500 as described herein for network element 124.

Some or all of the actions performed by the exemplary embodiments described herein can be performed under the control of a computer system executing computer-readable codes embedded on a computer-readable recording medium or on communication signals transmitted through a transitory medium. The computer-readable recording medium may include any data storage device that can store data which can thereafter be read by a computer system. Examples of the computer-readable recording medium include, but are not limited to, read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. The communication signals transmitted through a transitory medium may include, for example, signals which modulate carrier waves transmitted through wired or wireless transmission paths.

The above description and associated figures explain the best mode of the present teachings. Other embodiments will be apparent to those skilled in the art from consideration of the specification and practice of the teachings disclosed herein. It is intended that the specification and examples be considered as exemplary only, with a true scope and spirit present teachings being indicated by the following claims.

What is claimed is:

1. A method to manage idle mode operation of a communication device in a communication system comprising:
   receiving, by a node of the communication system from the communication device, a request to enter idle mode comprising a request to enable automatic renewal of an internet protocol (IP) address currently assigned to the communication device comprising a length of an IP address lease timer corresponding to the IP address currently allocated to the communication device and a length of an IP address update lease timer corresponding to the IP address;
   transmitting, to an IP address allocation unit which allocated the IP address to the communication device, the idle mode request;
   receiving, from the IP address allocation unit, an idle mode response comprising an IP lease update acknowledgement associated with the idle mode request;
   transmitting, to the communication device, the idle mode response;
   enabling, by the node of the communication system, automatic renewal of the IP address;
   configuring, by the node of the communication system, an idle mode timer corresponding to the IP address update lease timer, wherein the communication device enters idle mode after receiving the idle mode response and before the idle mode timer expires; and
   transmitting, by the node of the communication system to the IP address allocation unit, an IP lease update request corresponding to the IP address, when the idle mode timer expires and the communication device is in idle mode.

2. The method of claim 1, wherein the IP address allocation unit comprises a dynamic host configuration protocol server.

3. The method of claim 1, wherein the communication system comprises a wireless communication system and the communication device comprises a wireless communication device.

4. The method of claim 3, wherein the wireless communication system comprises a WIMAX-compatible communication system.

5. The method of claim 4, wherein the node of the communication system comprises an access service network gateway.

6. The method of claim 1, further comprising:
   disabling, by the node of the communication system, automatic renewal of the IP address, when the communication device exits idle mode.

7. The method of claim 1, further comprising:
   receiving, from the IP address allocation unit, an IP lease update acknowledgement associated with the IP lease update request; and configuring, by the node of the communication system, the idle mode timer corresponding to the IP address update lease timer, when receiving the IP lease update acknowledgment and the communication device is in idle mode.

8. A communication system element comprising:

a communication interface configured to communicate with at least an internet protocol (IP) address allocation unit and an access node of the communication system; and a processing system coupled to the communication interface comprising a processing unit and a storage unit, the processing system configured to control the communication system element to:

receive, from the access node, a request to enter idle mode comprising a request to enable automatic renewal of an IP address currently assigned to a communication device comprising a length of an IP address lease timer corresponding to the IP address currently allocated to the communication device by the IP address allocation unit and a length of an IP address update lease timer corresponding to the IP address by the IP address allocation unit;

transmit, to the IP address allocation unit, the idle mode request;

receive, from the IP address allocation unit, an idle mode response comprising an IP lease update acknowledgement associated with the idle mode request;

transmit, to the access node, the idle mode response;

enable automatic renewal of the IP address;

configure an idle mode timer corresponding to the IP address update lease timer, wherein the communication device enters idle mode after receiving the idle mode response and before the idle mode timer expires; and transmit, to the IP address allocation unit, an IP lease update request corresponding to the IP address, when the idle mode timer expires and the communication device is in idle mode.

9. The communication system element of claim 8, wherein the IP address allocation unit comprises a dynamic host configuration protocol server.

10. The communication system element of claim 9, wherein the communication system comprises a wireless communication system and the communication device comprises a wireless communication device.

11. The communication system element of claim 10, wherein the wireless communication system comprises a WIMAX-compatible communication system.

12. The communication system element of claim 11, wherein the communication system element comprises an access service network gateway.

13. The communication system element of claim 8, wherein the processing system is further configured to control the communication system element to:

disable automatic renewal of the IP address, when the communication device exits idle mode.

14. The communication system element of claim 8, wherein the processing system is further configured to control the communication system element to:

receive, from the IP address allocation unit, an IP lease update acknowledgement associated with the IP lease update request; and configure the idle mode timer corresponding to the IP address update timer, when receiving the IP lease update acknowledgment and the communication device is in idle mode.

* * * * *